W. GRUS, Jr.
SPRING LEAF LUBRICATOR.
APPLICATION FILED JUNE 7, 1916.
1,279,538.
Patented Sept. 24, 1918.
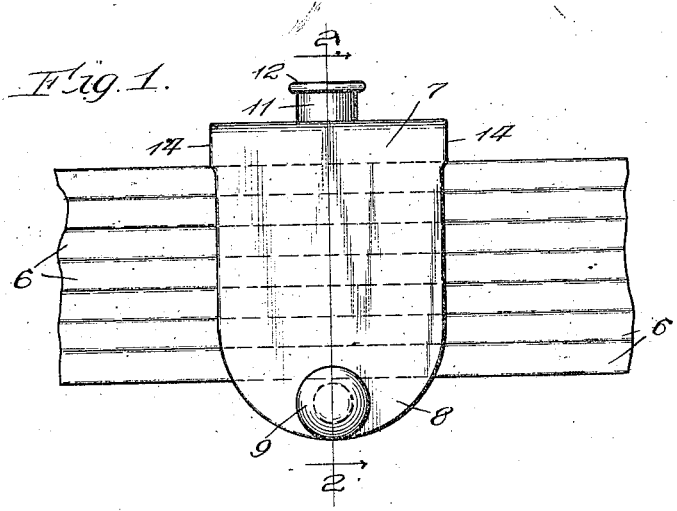
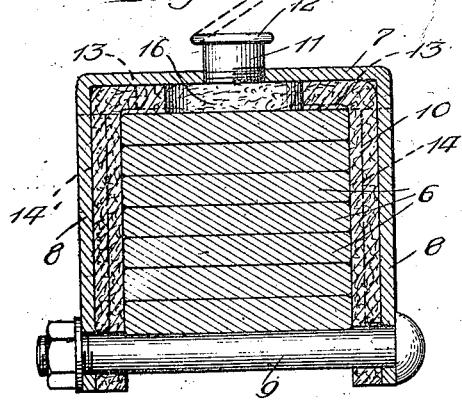
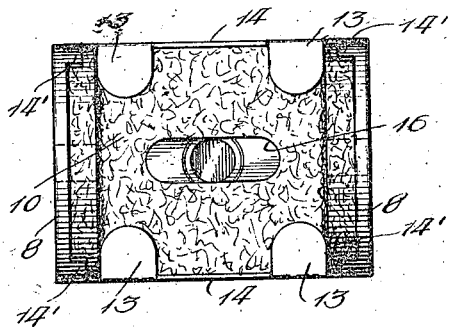
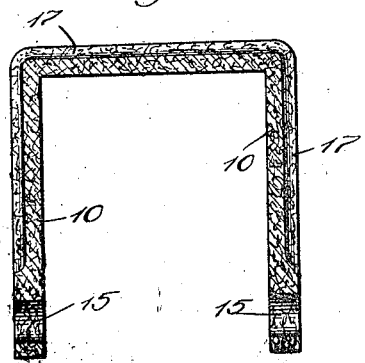
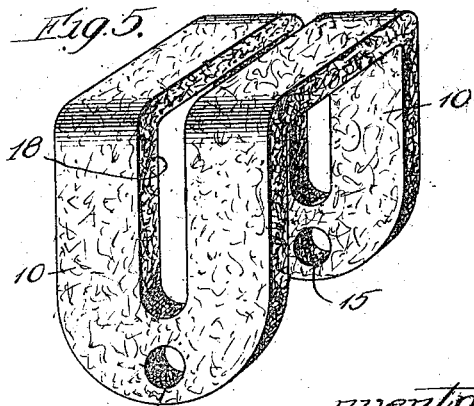
Inventor
Wm Grus Jr.

UNITED STATES PATENT OFFICE.

WILLIAM GRUS, JR., OF CHICAGO, ILLINOIS.

SPRING-LEAF LUBRICATOR.

1,279,538.

Specification of Letters Patent. Patented Sept. 24, 1918.

Application filed June 7, 1916. Serial No. 102,122.

*To all whom it may concern:*

Be it known that I, WILLIAM GRUS, Jr., a citizen of the United States, residing at Chicago, in the county of Cook and State of Illinois, have invented certain new and useful Improvements in Spring-Leaf Lubricators, of which the following is a specification.

This invention relates to lubrication of automobile leaf springs, and the like, by introducing a lubricant from both sides of the spring at the edges thereof. The principal object of the invention is to provide a novel construction, combination and arrangement of parts for accomplishing this result.

In the drawings—Figure 1 is a side elevation of a portion of a leaf spring with a lubricator constructed in accordance with the principles of this invention applied thereto; Fig. 2 is a sectional view taken on the line 2—2 of Fig. 1; Fig. 3 is a view looking at the bottom of the lubricator without the spring inserted; Fig. 4 shows a modification of a lubricating element with a groove therein; and Fig. 5 is a modification of the lubricating element having a slot extending over the top and sides.

A satisfactory method of oiling the leaves of a spring is to introduce the lubricant from both sides of the spring at the edges of the leaves thereof. The present invention relates to a device for satisfactorily accomplishing this result.

A spring of the class to which this invention is applied comprises a plurality of separate superposed leaves 6 which are held together in any suitable manner with a lubricating device applied to the spring preferably at a slight distance from the place where the leaves are rigidly attached together. This lubricator comprises a single member 7, preferably U-shaped in construction, with sides 8 which extend down over the sides of a leaf spring and with perforations at the bottom through which a bolt 9 may be inserted for fastening the device to the spring. Inserted between the U-shaped member 7 and the spring is a single strip or piece of fabric or absorbent material 10, preferably felt or some similar substance, which entirely fills the space between the members 7 and the leaves 6. In fact, the device with the lubricating material inserted fits snugly over the spring so that it may be necessary to slightly compress the lubricating material to properly hold the lubricating device in place by means of a bolt 9.

At the top of the member 7 is a lubricating cup 11 with a lid or top 12 which may be raised, as shown in dotted outline in Fig. 2, to insert a lubricant therein. Depending from the sides of the top portion of this member 7 are a number of bendable clips 13, preferably two on each side, which may be bent over the lubricating material 10 for holding it in place when the lubricating device is not applied to a spring and for assistance in holding the material in place when the lubricating device is applied to a spring. If desired, these clips 13 may be bent from a flange 14 on each side of the member 7 at its top portion. To assist in holding the lubricating material 10 in place, the edges of the depending sides 8 may also be formed with flanges 14' which may terminate near the end of each side 8, the flanges being of less thickness than the material 10 so that they will not interfere with the compression of the material or of the sides when the device is applied to a spring. To also assist in holding the lubricating material 10 in place the extremities are formed with perforations 15, as clearly shown in Figs. 4 and 5, which conform in shape to the extremities of the depending sides 8, as shown in Fig. 1.

It is found advisable to make a small chamber at the top of the device by forming the lubricating material 10 with a slot or perforation 16, as shown in Figs. 2 and 3, which communicates directly with the oil cup 11 and forms therewith a receptacle for a small quantity of lubricating material. Instead of making this a perforation entirely through the lubricating material 10 a groove 17 may be provided, as shown in Fig. 4, which extends from the top toward the extremities of the material 10, terminating, however, at a distance from the ends thereof. Another construction comprising a slot 18, as shown by Fig. 5, is similar to that shown in Fig. 4 consisting of a slot entirely through the material 10 instead of a groove, as shown in Fig. 4.

When this lubricator is applied to a spring it is necessary only to insert the lubricant through the oil cup 11 and the lubricant is directed or applied to the edges of the leaves 6, where the lubricant will enter between the leaves by reason of its capillary attraction and the sliding movement of the leaves with respect to each other. The device is easily applied or removed by means of the bolt 9, and the clips 13 hold the lubricating material in place whether the device is applied to a leaf spring or not.

It should be understood, of course, that although this device is intended to be used with the oil cup 11 at the top side of a spring, it could be applied to a spring from the bottom side, in which case the absorbent material would act as a wick drawing the lubricant by capillary attraction from the bottom to the sides and edges of the leaves of the spring, the bolt 9 being fastened on top of the spring.

What I claim is:

1. In a leaf spring lubricator, an absorbent pad of uniform width applied over the top and against a limited portion of both edges of a spring and cut away at the top to form a lubricant receiving space and directing portions from which the portions at both edges of the spring are fed.

2. In a leaf spring lubricator, a single piece of absorbent material applied over the top and against both edges of a spring and cut away to form a lubricant receiving space and also with passages for directing lubricant to the portions of the material at both edges of the spring leaves.

3. The combination with a leaf spring, of a lubricator therefor comprising a single narrow perforated strip of lubricating material of uniform width applied over the top and downwardly over a portion of the edges of all the leaves on both sides thereof, and means at the top of the spring for feeding lubricant to both edges of the spring through the perforation in said material.

4. The combination with a leaf spring, of a lubricator therefor comprising a single narrow perforated strip of lubricating material of uniform width applied over the top and downwardly over a portion of the edges of all the leaves on both sides thereof, and a casing fitting over the lubricating material having an aperture through which lubricant is applied to the material at the top of the spring and is fed to the side portions of the pad at both edges of the spring through the perforation in said material.

5. A lubricating device for vehicle springs comprising a single piece of lubricant absorbent material applied over the top and against both edges of a spring, means for holding the absorbent material in place, and an oil cup at the top for feeding lubricant to the absorbent material, the said absorbent material being cut away at the top to form a lubricant receiving space in direct communication with the oil cup.

6. In a leaf spring lubricator, a single pad of absorbent material adapted to fit over the top and against the edges at each side of a spring, and means of substantially the same shape for holding the absorbent material against the spring, said means being formed with bendable clips for holding the absorbent material in place whether it be applied to a spring or not.

7. The combination with a spring comprising a plurality of superposed leaves, of a single pad of absorbent material which extends over the top and downwardly against the edges of the leaves at both sides of the spring, the said pad being formed with perforations at the ends and at the said top portion, means for holding the pad against the spring, said means comprising a member of substantially the same shape as the pad having perforated extremities and bendable clips at the top for engaging the opposite sides of the pad, a fastening bolt insertible through the perforations of the pad and the said member, and an oil cup at the top of said member communicating directly with the perforation in the top of said pad.

8. A spring leaf lubricator comprising an absorbent pad; and a holder therefor comprising a member which fits over the pad and against the top of the spring and is spaced from the edges thereof so that the pad can be pressed against the edges of the leaves.

9. A spring leaf lubricator comprising a U-shaped member to fit over a spring against one side thereof, the extremities extending along the edges of the leaves beyond the other side, an absorbent pad to fit between the member and a leaf spring, the edges of the extremities of said U-shaped member having flanges which are of less width than the thickness of the pad, and means to engage the ends of said extremities to clamp the lubricator over a leaf spring and to compress the pad against the edges of a leaf spring.

10. A lubricating device for vehicle springs comprising a single piece of absorbent material applied over the top and against both edges of the spring with a cutaway portion to form an oil container, and means for holding the absorbent material in place with a feeding aperture communicating with said container.

11. In a leaf spring lubricator, a single piece of lubricating material of uniform width applied over the top and against both edges of the leaves, and a single casing fitting over the said material engaging the top of the spring and having flanges spaced from the edges of the spring for confining the material lengthwise of the spring.

12. In a leaf spring oiler, a pad of lubricating material extending over the top and downwardly over both sides of the spring with perforations at the ends, a casing of substantially the same shape extending over the pad and also having perforations at the ends, and fastening means insertible through the perforations of the material and casing for holding them in place and for compressing the material.

13. In a leaf spring oiler, a single piece of absorbent material applied over the top and against both edges of the spring leaves with a cut-away portion at the top to form an oil container and passages therefrom to the portions thereof at the side of the spring, and a single piece of casing fitting entirely over the material with a feeding aperture communicating with the container portion thereof.

14. In a leaf spring lubricator, an absorbent pad extending over the top and downwardly against the edges of the leaves at both sides of the spring, a holder therefor of substantially the same shape which rests against the top of the spring but is spaced from the sides thereof and with perforations at the extremities below the spring, and fastening means engaging the extremities to compress the pad at both sides of the spring.

15. In a spring leaf lubricator, an absorbent pad of uniform width to extend lengthwise across the top and downwardly against a portion of the edges of the leaves at both sides of the spring, a similarly shaped holding member fitting over the pad having extremities with inwardly extending flanges which are of less width than the thickness of the pad so that the pad can be held in place and compressed against the edges of the leaves.

16. A lubricating device for vehicle springs comprising a single piece of lubricant absorbing material applied over the top and against both edges of a spring, the said absorbing material being cut away at the top to form a lubricant receiving space, and means for holding the said material in place.

17. A spring leaf lubricator comprising an absorbent pad extending over the edges of the leaves, a holder therefor fitting over the pad and against the top of the spring and spaced from the edges thereof, and means for engaging the ends of the holder for pressing the pad against the edges of the leaves.

18. A lubricating device for vehicle springs comprising a single piece of absorbent material applied over the top and against both edges of the spring with a cut-away portion at the top to form an oil container, and a single metal casing for holding the absorbent material in place.

19. In a leaf spring lubricator, an absorbent pad extending over the top and with extremities extending downwardly against the edges of the leaves at both sides of the spring, a holder therefor of substantially the same shape which rests against the top of the spring with extremities extending below it, and fastening means for engaging the extremities to press the pad at both sides of the spring.

20. A lubricating device comprising a single piece of absorbent material applied over the top and against both edges of the spring, with a cutaway portion to form an oil container including passages to the portions at the sides of the springs, and means for holding the absorbent material in place.

21. A lubricating device comprising a single piece of absorbent material applied over the top and against both edges of the spring, with a cutaway portion to form an oil container including passages to the portions at the sides of the springs, and a single metal casing for holding the absorbent material in place with a feeding aperture communicating with said container.

22. The combination with a spring having a plurality of leaves, of a lubricator comprising a single piece of lubricating fabric of uniform width applied on the top and downwardly over the edges of the leaves on both sides, and confining means for the fabric of substantially the shape of the fabric as it is when applied to the spring.

23. In a leaf spring oiler, the combination of a casing provided with side members adapted to extend over the edges of all of the leaves of the spring, and a resilient pad provided with a central hole for an oil retainer on top of the spring and extending downwardly over the edges of all of the leaves.

24. In a leaf spring oiler, a pad extending across the top and both sides of the spring and having an opening in the pad at the top and extending into the side portions of the pad.

25. In a leaf spring oiler, the combination of a pad to extend across the top and both sides of a spring and having an opening in the pad at the top extending in the side portions of the pad, and a metallic casing fitting over the pad to hold it in place on the spring.

In testimony whereof I have signed my name to this specification, in the presence of two subscribing witnesses, on this 2d day of June, A. D. 1916.

WILLIAM GRUS, Jr.

Witnesses:
C. H. SEEM,
K. W. WONNELL.